(12) United States Patent
Becker (10) Patent No.: US 8,016,320 B2
(45) Date of Patent: Sep. 13, 2011

(54) VIBRATION DAMPENING SYSTEMS FOR OVERHEAD FRAME STRUCTURES

(75) Inventor: Steven Richard Becker, Litchfield, MN (US)

(73) Assignee: Custom Products of Litchfield, Inc., Litchfield, MN (US)

( * ) Notice: Subject to any disclaimer, the term of this patent is extended or adjusted under 35 U.S.C. 154(b) by 0 days.

(21) Appl. No.: 12/688,370

(22) Filed: Jan. 15, 2010

(65) Prior Publication Data

US 2010/0176616 A1  Jul. 15, 2010

Related U.S. Application Data

(63) Continuation of application No. 11/259,856, filed on Oct. 26, 2005, now Pat. No. 7,661,709.

(51) Int. Cl.
*B60R 21/13* (2006.01)
(52) U.S. Cl. ...................................................... 280/756
(58) Field of Classification Search .................. 280/748, 280/756; 296/105, 190.03, 207; 16/86 A, 16/86 R
See application file for complete search history.

(56) References Cited

U.S. PATENT DOCUMENTS

| | | |
|---|---|---|
| 2,145,307 A | 1/1939 | Hunt |
| 2,708,560 A | 5/1955 | Paley |
| 2,805,442 A | 9/1957 | Ragsdale |
| 3,053,571 A | 9/1962 | Fox |
| 3,524,674 A | 8/1970 | Medeiros |
| 3,762,761 A | 10/1973 | Erickson |
| 3,917,310 A | 11/1975 | Mitsuishi |
| 3,976,326 A | 8/1976 | Grumblatt |
| 4,120,528 A | 10/1978 | Samide |
| 4,158,460 A | 6/1979 | White |
| 4,183,593 A | 1/1980 | Peterson |
| 4,240,179 A | 12/1980 | Lautenschlager, Jr. |
| 4,391,344 A | 7/1983 | Weber et al. |
| 4,720,142 A | 1/1988 | Holdredge et al. |
| 4,794,669 A | 1/1989 | Sanders |
| 4,830,402 A | 5/1989 | Matthias et al. |
| 4,877,265 A | 10/1989 | DeBraal et al. |
| 4,949,991 A | 8/1990 | Ludwig |
| 5,042,835 A | 8/1991 | Burns |
| 5,393,194 A | 2/1995 | Smith |

(Continued)

FOREIGN PATENT DOCUMENTS

EP  0 051 100 A1  5/1982

(Continued)

OTHER PUBLICATIONS

Cub Cader Operator's Manual, Series 7000 Compact Tractor, Model Nos. 7530, 7532; printed in U.S.A., Form No. 769-01060, (Jan. 2004), p. 13.

(Continued)

*Primary Examiner* — Paul N Dickson
*Assistant Examiner* — Robert A Coker
(74) *Attorney, Agent, or Firm* — Fredrikson & Byron, P.A.

(57) ABSTRACT

Embodiments of the invention relate to providing a vibration dampening system for an overhead frame structure used with a vehicle. The system involves the provision of one or more dampening members and/or components between portions of one or more members forming the overhead frame structure. The dampening members or components are compressed when certain portions of the members are set in position. As a result, the vibration and contact normally encountered between the portions and/or interconnecting brackets is limited, and in turn, the stress normally experienced by the one or more fastener assemblies holding the portions and/or the interconnecting brackets due to such vibration is also limited.

19 Claims, 10 Drawing Sheets

U.S. PATENT DOCUMENTS

| | | | |
|---|---|---|---|
| 5,503,430 A | 4/1996 | Miki et al. | |
| 5,779,272 A | 7/1998 | Panek et al. | |
| 2005/0212278 A1 | 9/2005 | Kurten et al. | |

FOREIGN PATENT DOCUMENTS

| | | |
|---|---|---|
| GB | 2 175 259 A | 11/1986 |
| JP | 06 312622 | 11/1994 |
| JP | 2000 043662 | 2/2000 |
| JP | 2003 026055 | 1/2003 |

OTHER PUBLICATIONS

Service Manual for the Compact Tractor, Model Nos. 7530, 7532, (undated), pp. 118-119.

VIBRATION DAMPENING SYSTEMS FOR OVERHEAD FRAME STRUCTURES

This application is a continuation of U.S. application Ser. No. 11/259,856, which was filed on Oct. 26, 2005 and is incorporated herein by reference.

FIELD

The invention relates to overhead frame structures utilized on vehicles, and in particular, to vibration dampening systems for the overhead frame structures.

BACKGROUND SECTION

Overhead frame structures are typically fabricated of one or more members forming a framework. Such structures can be used on a vehicle for one or more reasons. The structures can be utilized to protect an operator from injury in the event of accidental upset or inadvertent rollover of the vehicle. Additionally, the structures can be used for mounting various accessories thereto. Further, the frameworks of the structures can be used to mount enclosure elements thereto.

Each framework member of an overhead frame structure is composed of one or more portions. If composed of more than one portion, the corresponding member is generally assembled by either connecting such portions together directly or indirectly using one or more interconnecting brackets. Such methods of connecting the member portions are generally facilitated via the use of one or more fasteners. Once each member of the frame structure is provided, the overhead frame structure can in turn be formed by connecting the members together directly or indirectly using one or more interconnecting brackets (if necessary) and connecting the members to the vehicle. Such methods of connecting the members to other members and/or the frame are generally facilitated via the use of one or more fasteners.

While mounting an overhead frame structure on a vehicle may be advantageous for a variety of reasons as exemplified above, certain situations may exist in which one would want to temporarily modify the structure's configuration. For example, the vehicle may be driven in low overhead clearance areas, during which the process of maneuvering the vehicle having the overhead frame structure is made difficult. As a consequence, certain overhead frame structures have been designed to be adjustable. For example, in some designs, an upper part of the structure is made adjustable with respect to a lower part of the structure. In turn, the upper part can be lowered with respect to the lower part to provide a desirable height for the overhead frame structure. In some designs, this adjustment is facilitated by removal of at least one arresting device used to hold the upper and lower parts together, either directly or through the use of an interconnecting bracket. In such designs, the arresting members can involve fasteners using linchpins, which enables quick changeover of the overhead frame structure from one configuration (e.g., with upper parts raised) to another configuration (e.g., with upper parts lowered). Using fasteners with linchpins as the arresting members also typically enables the connected parts or one of the parts and interconnecting bracket(s) to have some freedom in their connection.

Quite often, vehicles accommodating overhead frame structures are operated in regions of rough terrain. As such, the center of gravity of the vehicles can be found to temporarily change as the vehicles travel over such terrain. Consequently, one or more of the members forming the overhead frame structures can be found to shift in position with each change of vehicle center of gravity. In designs where there is freedom in the connection of the members or parts thereof of the overhead frame structure (as exemplified above), this shift of the members can cause these members and/or parts thereof to generally vibrate against other members or interconnecting brackets. This vibration, in turn, can cause a rattling to occur between these bodies. In addition, this vibration can temporarily stress one or more of the fasteners connecting the members or parts and/or the interconnecting brackets. Over time, the stress experienced by the one or more fasteners of the overhead frame structure due to this vibration can be found to weaken the fasteners.

Embodiments of the present invention are directed to overcoming, or at least reducing these limitations.

SUMMARY

Embodiments of the invention relate to providing a vibration dampening system for an overhead frame structure used with a vehicle. The system involves the provision of one or more dampening members and/or components between portions of one or more members forming the overhead frame structure. The dampening members or components are compressed when certain portions of the members are set in position. As a result, the vibration and contact normally encountered between the portions and/or interconnecting brackets is limited, and in turn, the stress normally experienced by the one or more fastener assemblies holding the portions and/or the interconnecting brackets due to such vibration is also limited.

In some embodiments, an overhead frame structure for a vehicle is provided. The structure comprises one or more members forming the overhead frame structure, with one of the members having one or more upper portions and one or more lower portions. One upper portion of the one member is adjustable with respect to one lower portion of the one member. The structure also comprises a bracket interconnecting the one upper portion and the one lower portion. The structure further comprises a first dampening member protruding from a side of the bracket. The first dampening member is compressed between the bracket and one of the one upper portion and the one lower portion when the one upper portion is in a first position.

Additionally, in some embodiments, a method of limiting vibration of an overhead frame structure for a vehicle is provided. The method comprises a step of providing one or more members for forming the overhead frame structure, with one of the members having one or more upper portions and one or more lower portions. The method also comprises a step of interconnecting one upper portion and one lower portion of the one member with a bracket, with the one upper portion being made adjustable with respect to the one lower portion. Further, the method comprises a step of locating a first dampening member on a side of the bracket, with the first dampening member protruding from the bracket side and being compressed between the bracket and one of the one upper portion and the one lower portion when the one upper portion is in a first position.

Further, in some embodiments, an overhead frame structure for a vehicle is provided. The structure comprises one or more members forming the overhead frame structure, with one of the members having one or more upper portions and one or more lower portions. One upper portion of the one member is adjustable with respect to one lower portion of the one member. The structure also comprises a bracket interconnecting the one upper portion and the one lower portion. The structure further comprises a first dampening member protruding from a side of the one upper portion. The first dampening member is compressed between the one upper portion and the one lower portion when the one upper portion is in a first position.

DETAILED DESCRIPTION OF THE PREFERRED EMBODIMENTS

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. For example, the invention is generally designed for use on vehicles such as mowing and agricultural equipment; however, it may also be used on other vehicles such as golf carts, go-carts, all-terrain vehicles, utility vehicles, construction equipment, and the like.

In many vehicle designs, an overhead frame structure is used. As mentioned above, such a structure can be utilized for a number of different functions. In light of this, it should be appreciated that the overhead frame structure of the invention can involve the use of (and could alternatively be referenced as) a rollover protective structure (ROPS), a falling object protective structure (FOPS), an accessory frame, a cab frame, or any combination thereof. As also mentioned above, the structure is typically fabricated of one or more members. If more than one member is utilized in forming the structure, such members can be assembled and mounted to the vehicle to form a framework, e.g., for surrounding the operator. Conversely, if only one member is used, the structure is generally mounted to the vehicle so as to be located proximate to the operator of the vehicle. In certain embodiments, the overhead frame structure includes at least one member including two or more vertical posts having lower portions operatively coupled to the vehicle frame and upper portions joined by one or more horizontal cross segments. As described above, one or more of the members of the structure can involve more than one portion. Such an overhead frame structure is illustrated in FIG. 1.

Figure 1:
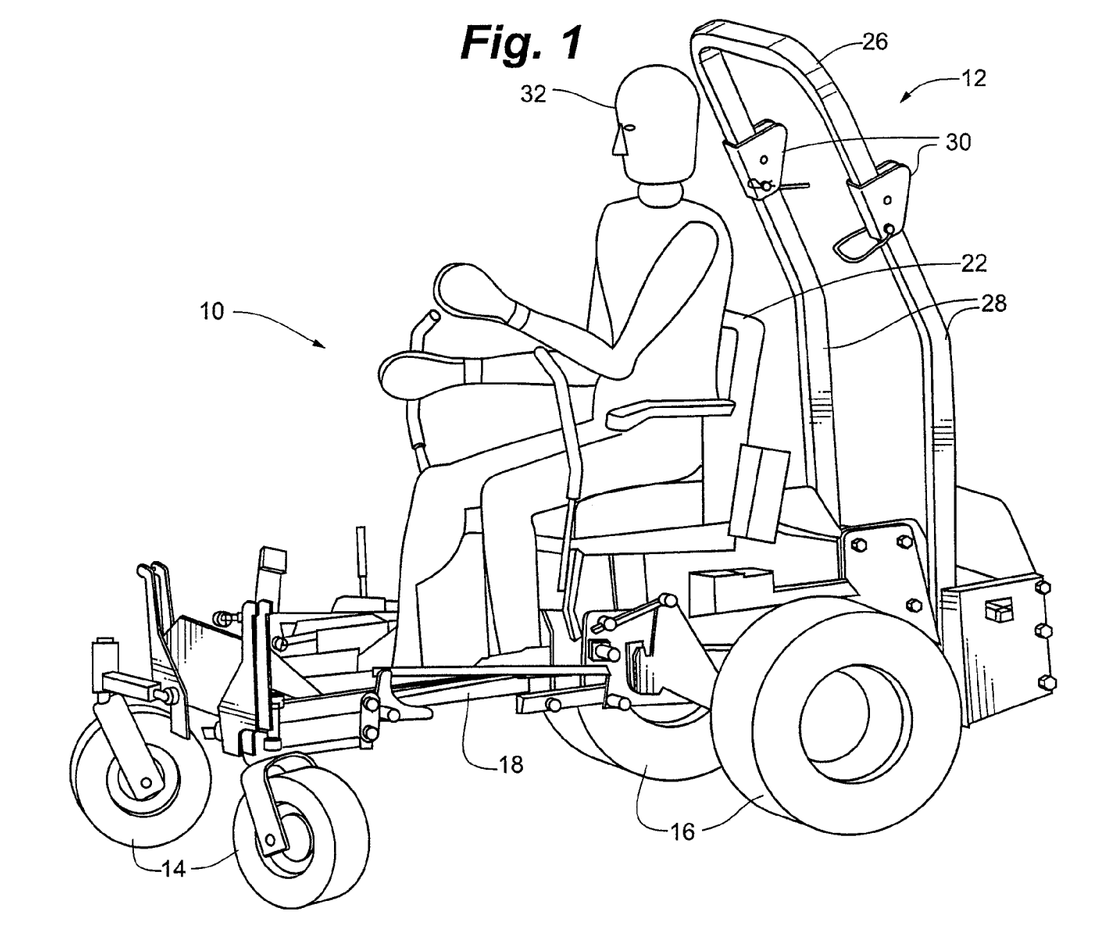
FIG. 1 is a side perspective view of a vehicle, illustrating an overhead frame structure in accordance with certain embodiments of the invention.

FIG. 1 shows a side perspective view of a vehicle 10, illustrating an overhead frame structure 12 in accordance with certain embodiments of the invention. While a mowing vehicle is generally shown in FIG. 1, as described above, the invention should not be limited as such. In certain embodiments, as shown, the vehicle 10 has front wheels 14, rear wheels 16, a frame 18, a seat 20, and the overhead frame structure 12. As shown, the seat 20 is designed to accommodate an operator 32; however, in certain embodiments, the seat 20 can alternatively designed to accommodate both the operator 32 and a passenger. Also, while not shown, it is to be appreciated that the vehicle will include an engine compartment generally supported by the frame 18. In addition, while not shown, it should also be appreciated that the vehicle 10 can be alternatively equipped with other mechanisms (e.g., rubber tracks) used instead of or in combination with one or more of the wheels 14, 16 if desired.

The overhead frame structure 12 involves at least one member having upper and lower portions, 26 and 28 respectively. In certain embodiments, as shown, the structure 12 has a single upper portion 26 and a pair of lower portions 28. Both the upper and lower portions 26, 28 are formed of a rigid material (e.g., steel). In certain embodiments, as shown, the upper and lower portions 26, 28 involve tubing having a rectangular outer shape. As illustrated, in certain embodiments, the upper and lower portions 26, 28 are interconnected using brackets 30, which are likewise formed of a rigid material (e.g., steel).

Each lower portion 28 of the overhead frame structure 12 is operatively coupled to the frame 18 of the vehicle 10. In certain embodiments, a fastener assembly (not shown) is used to secure the lower portions 28 to the frame 18. As such, at least one fastener assembly would be used on each lower portion 28 that makes contact with the frame 18. In certain embodiments, each fastener assembly would include at least one threaded bolt and one threaded nut. However, it should be appreciated that a variety of other fastener assemblies could be used as well to secure the structure 12 to the frame 18 without departing from the spirit of the invention.

Figure 2:
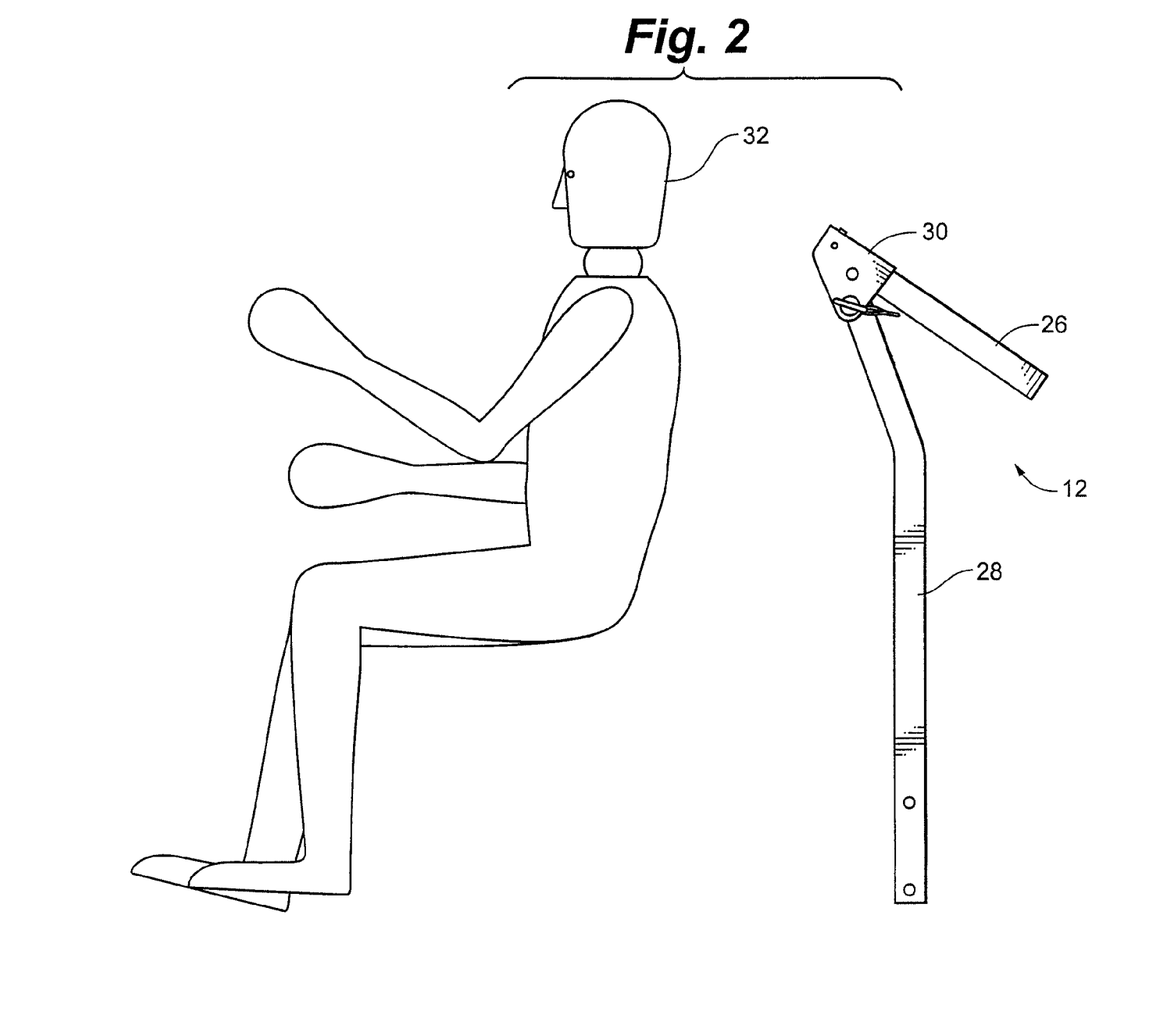
FIG. 2 is a side elevation view of the overhead frame structure of FIG. 1 in relation to an operator, illustrating an upper portion of the overhead frame structure in a lowered position.
Figure 6:
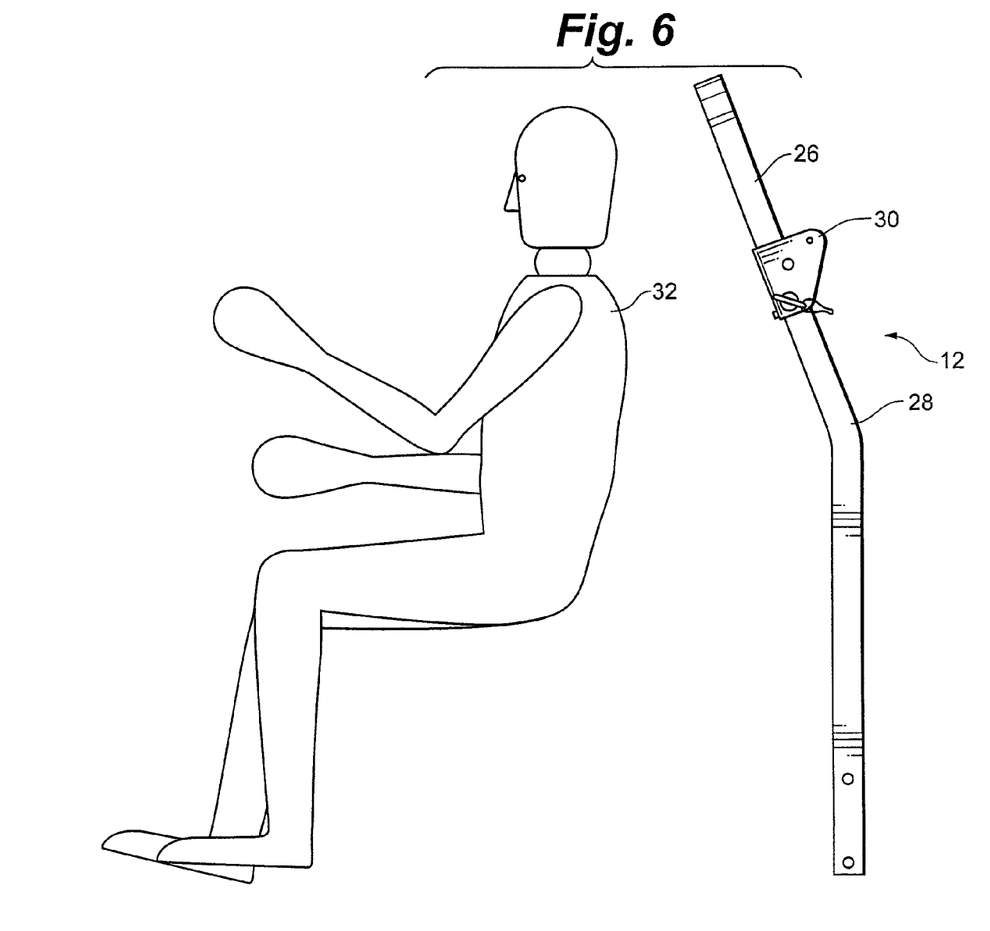
FIG. 6 is a side elevation view of the overhead frame structure of FIG. 1 in relation to an operator, illustrating an upper portion of the overhead frame structure in a raised position.

FIGS. 2 and 6 illustrate side elevation views of the overhead frame structure 12 of FIG. 1 and show the location of the operator 32 in proximity to the structure 12 in accordance with certain embodiments of the invention. For simplicity purposes, FIGS. 2 and 6 do not show the vehicle 10 shown in FIG. 1. However, with the location of the overhead frame structure 12 and the operator 32 (i.e., whereby the vehicle seat 22 of FIG. 1 would accommodate the operator 32) being illustrated, one skilled in the art would appreciate the vehicle's normal inclusion in FIGS. 2 and 6 even if not visibly shown. As shown in FIGS. 2 and 6, the overhead frame structure 12 is located rearward of the operator 32; however, the structure 12 could just as well be located to the side or forward of the operator 32 without departing from the spirit of the invention. As shown in FIG. 2, the upper portion 26 of the overhead frame structure 12 is set in a lowered position with respect to the lower portions 28. In this lowered position, the upper portion 26 extends generally downward, being lowered with respect to the lower portions 28 such that the height of the overhead frame structure 12 is lower than the height of the operator 32. As shown in FIG. 6, the upper portion 26 of the overhead frame structure 12 is set in a raised position with respect to the lower portions 28. In this raised position, the upper portion 26 extends generally upward, being raised with respect to the lower portions 28 such that the height of the overhead frame structure 12 is higher than the height of the operator 32.

Figure 3:
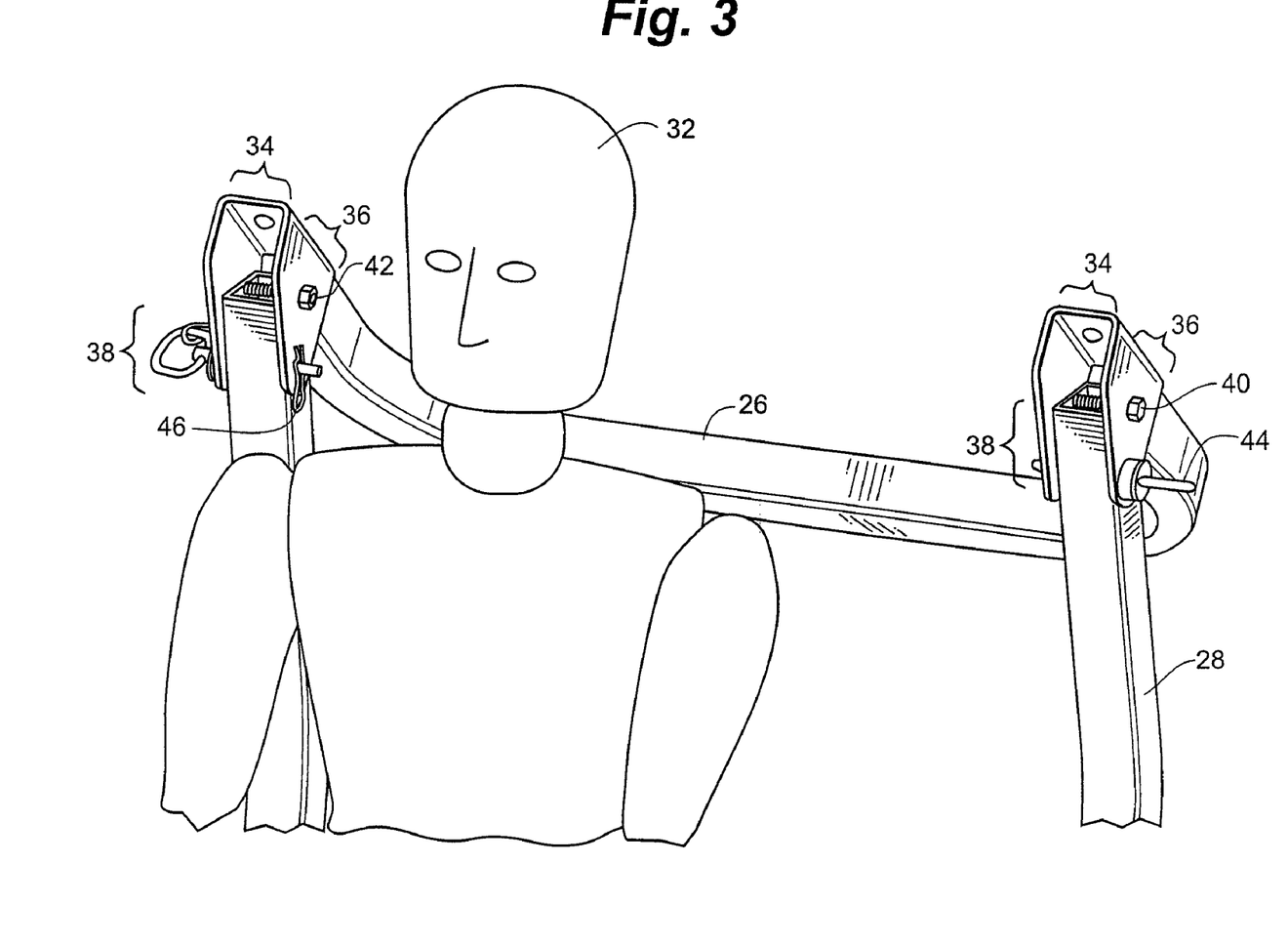
FIG. 3 is a front perspective view of part of the overhead frame structure of FIG. 2.

FIG. 3 shows a front perspective view of the overhead frame structure 12 of FIG. 1, with the upper portion 26 of the overhead frame structure 12 being set in the lowered position. In certain embodiments, as shown, each of the brackets 30 form channels 34 in which an end segment 36 of the upper portion 26 and an end segment 38 of the lower portion 28 are received. Each of these end segments 36, 38 are, in turn, operatively coupled to such brackets 30. In certain embodiments, one of the end segments 36, 38 is fixedly coupled to the bracket 30 and the other of the end segments 36, 38 is rotatably coupled to the bracket 30. For example, as shown, each upper portion end segment 36 is fixedly coupled to one of the brackets 30 and each lower portion end segment 38 is rotatably coupled to one of the brackets; however, the invention should not be limited to such. It is to be appreciated that as long as one of the end segments 36 or 38 is rotatably coupled to each of the brackets 30, the invention is still applicable. In certain embodiments, each upper portion end segment 36 is welded to the corresponding brackets 30; however, the invention should not be limited to such as it should be appreciated that such a fixed coupling can be provided by other means (e.g., using fasteners). In certain embodiments, each lower portion end segment 38 is rotatably coupled to the corresponding brackets 30 via two or more fastener assemblies. In certain embodiments, the two or more fastener assemblies include a first fastener 40 (e.g., a threaded bolt) and securing member 42 (e.g., a nut) and a second fastener 44 (e.g., a through-bolt) and retaining member 46 (e.g., a linchpin).

Figure 4:
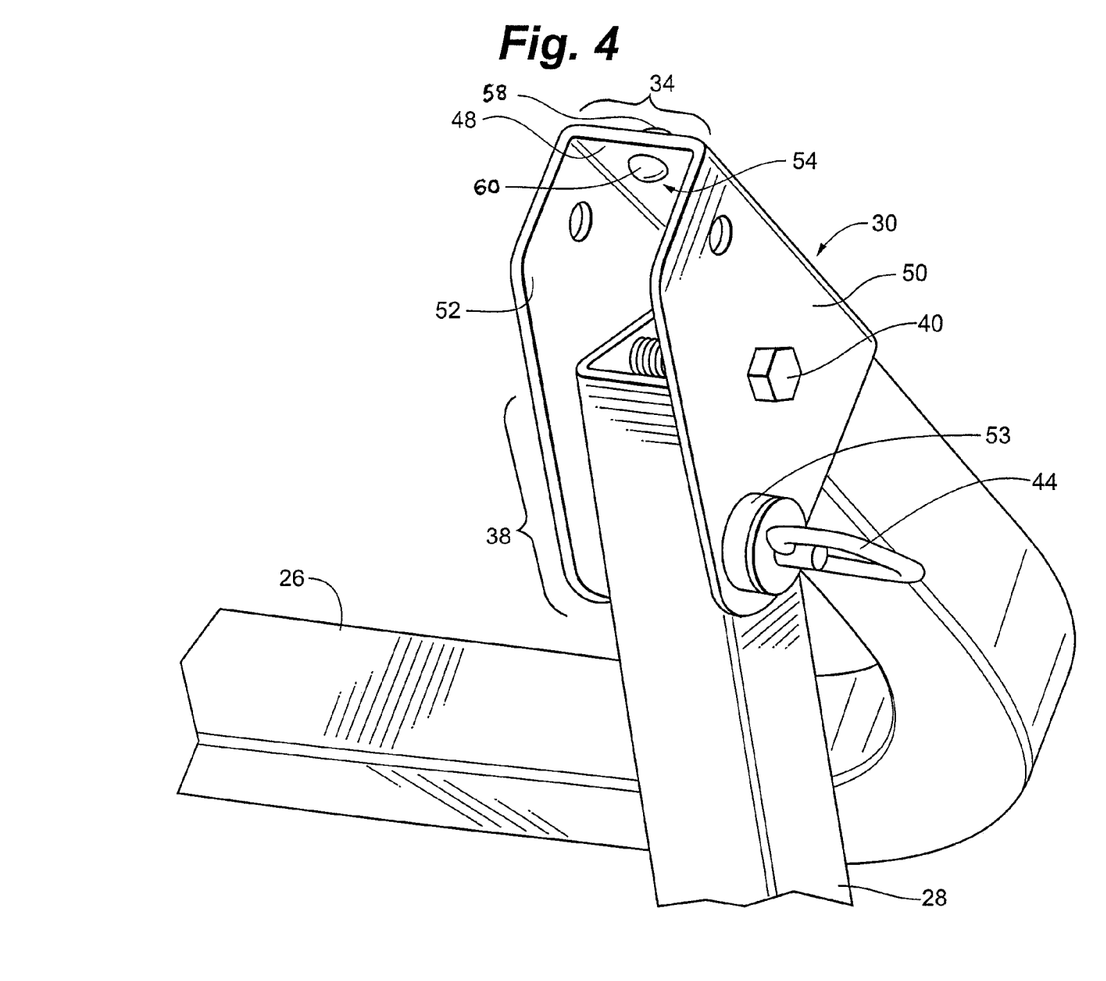
FIG. 4 is an enlarged view of a connection area of the overhead frame structure of FIG.

FIG. 4 illustrates an enlarged front perspective view of one of the brackets 30 of the overhead frame structure 12 of FIG. 1, with the upper portion 26 of the overhead frame structure 12 being set in the lowered position. In forming the channel 34 via a middle wall 48 and two side walls 50 and 52, each of the brackets 30 are generally shaped like a "U". As described above, in certain embodiments, the lower portion end segment 38 is rotatably secured to the bracket 30 via the first fastener 40 and securing member 42 (shown in FIG. 3) and the second fastener 44 and retaining member 46 (shown in FIG. 3). As illustrated, the first fastener 40 passes through both side walls 50, 52 of the bracket 30 and corresponding side walls of the lower portion end segment 38. Subsequently, the first fastener 40 is secured in place with the securing member 42 on the outer side of the bracket wall 52. The first fastener 40 serves as a pivot point for the upper portion 26 with respect to the lower portion 28. The second fastener 44, as shown, also passes through both side walls 50, 52 of the bracket 30 and corresponding side walls of the lower portion end segment 38. Subsequently, the second fastener 44 is held in place with the retaining member 46 (not visibly shown in FIG. 4, but shown in FIG. 3) on the outer side of the wall 52. The second fastener 44 serves to lock the upper portion 26 in position when set in the lowered position as shown.

With respect to the second fastener 44, the use of an elastic member 53 located between the head of the fastener 44 and the bracket wall 50 prevents the normal rattling between the fastener 44 and the bracket 30 during normal operation of the vehicle, while still enabling the fastener 44 to be changed out in a relatively quick fashion. In use, a head of the fastener 44 contacts the elastic member 53 upon insertion of the fastener 44. The elastic member 53 is depressed by the fastener head when securing the retaining member 46 to the fastener 44, and following such securement, the elastic member 53 expands to keep the fastener 44 in a snug orientation, thereby preventing rattling.

Figure 7:
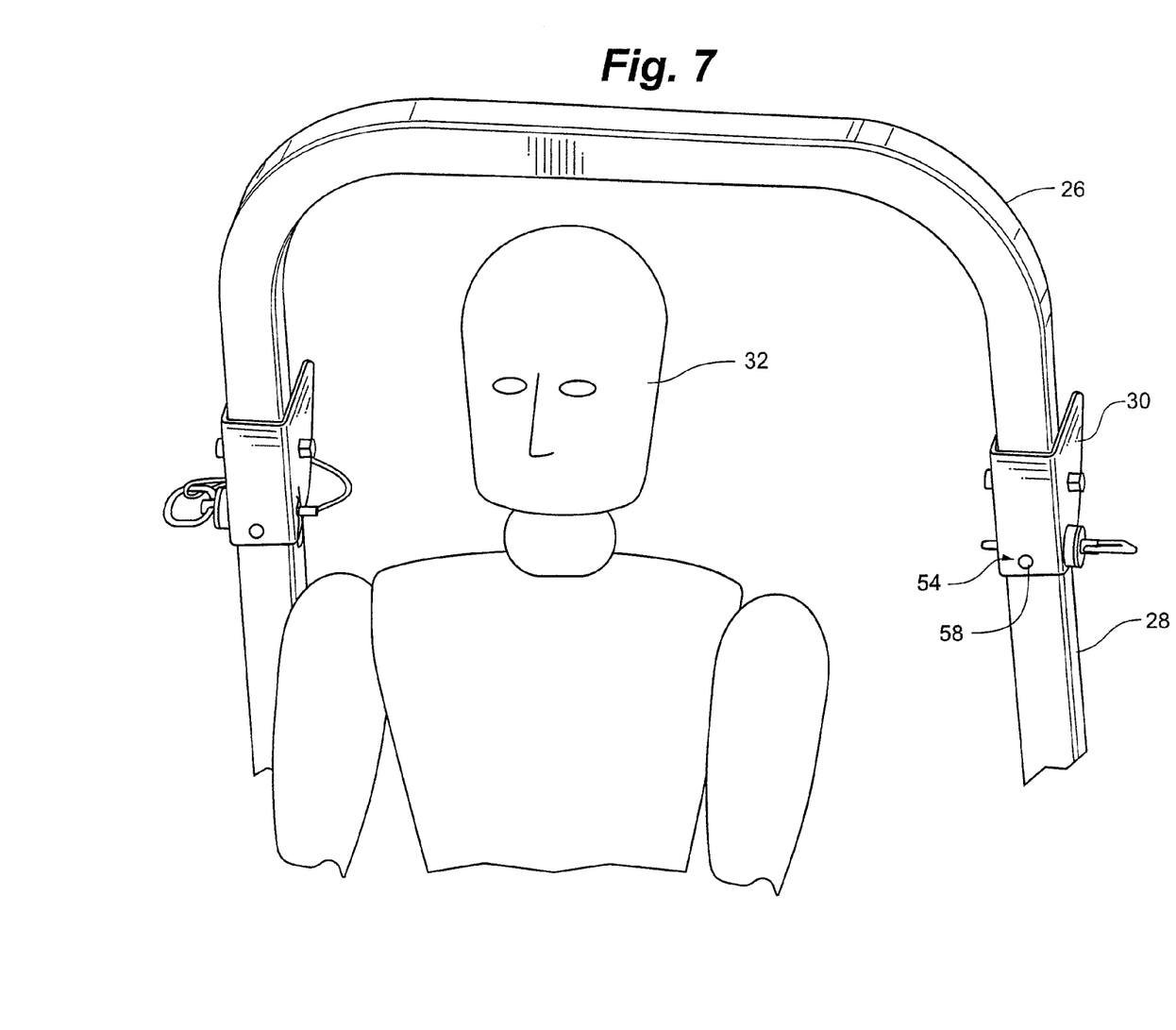
FIG. 7 is a front perspective view of part of the overhead frame structure of FIG. 6.
Figure 8:
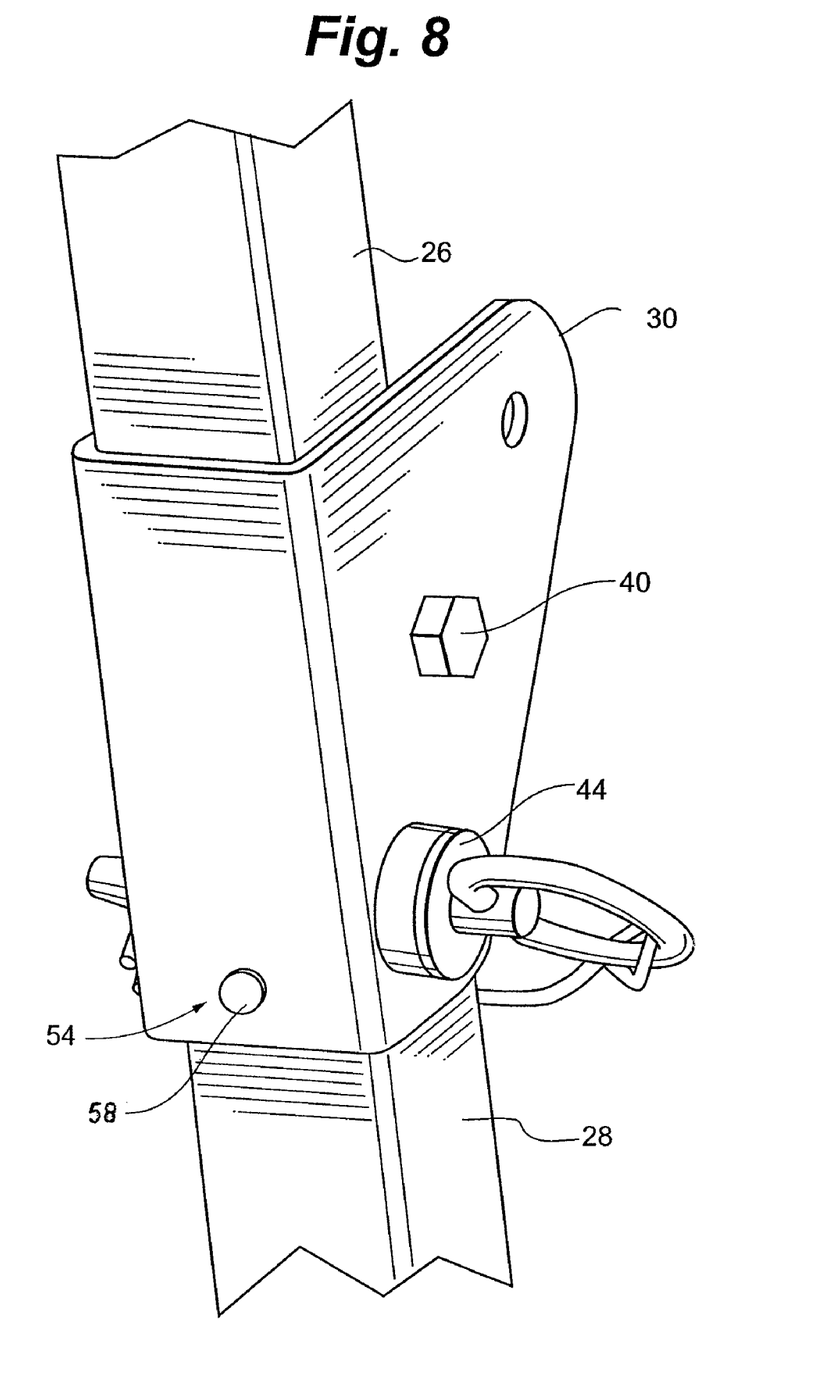
FIG. 8 is an enlarged view of a connection area of the overhead frame structure of FIG. 6.

Included on the assembly of the bracket 30 shown in FIG. 4 is a dampening member 54. As shown, the dampening member 54 protrudes from a lower end portion of the bracket middle wall 48. In certain embodiments, the dampening member 54 is operatively coupled to the bracket middle wall 48. In certain embodiments, the dampening member 54 partially extends through a bore 56 (shown in FIG. 5) defined in the middle wall 48. However, the invention should not be so limited. For example, the dampening member 54 can just as well be fixedly coupled to the middle wall 48 (e.g., via bonding means) or be partially screwed into the middle wall 48. In certain embodiments, the dampening member 54 is formed of rubber, but should not be limited as such, as the dampening member 54 can be formed of any elastic, yet durable material. The dampening member 54 includes at least one portion provided on the wall 48. In certain embodiments, the dampening member 54 includes a first portion 58 that extends through the bore 56 and includes a second portion 60 that is larger in size than the bore 56. As shown in FIG. 4, the second portion 60 of the dampening member 54 lies completely within the channel 34 of the bracket 30. The function of the dampening member 54 will be described below with reference to FIGS. 7 and 8.

Figure 5:
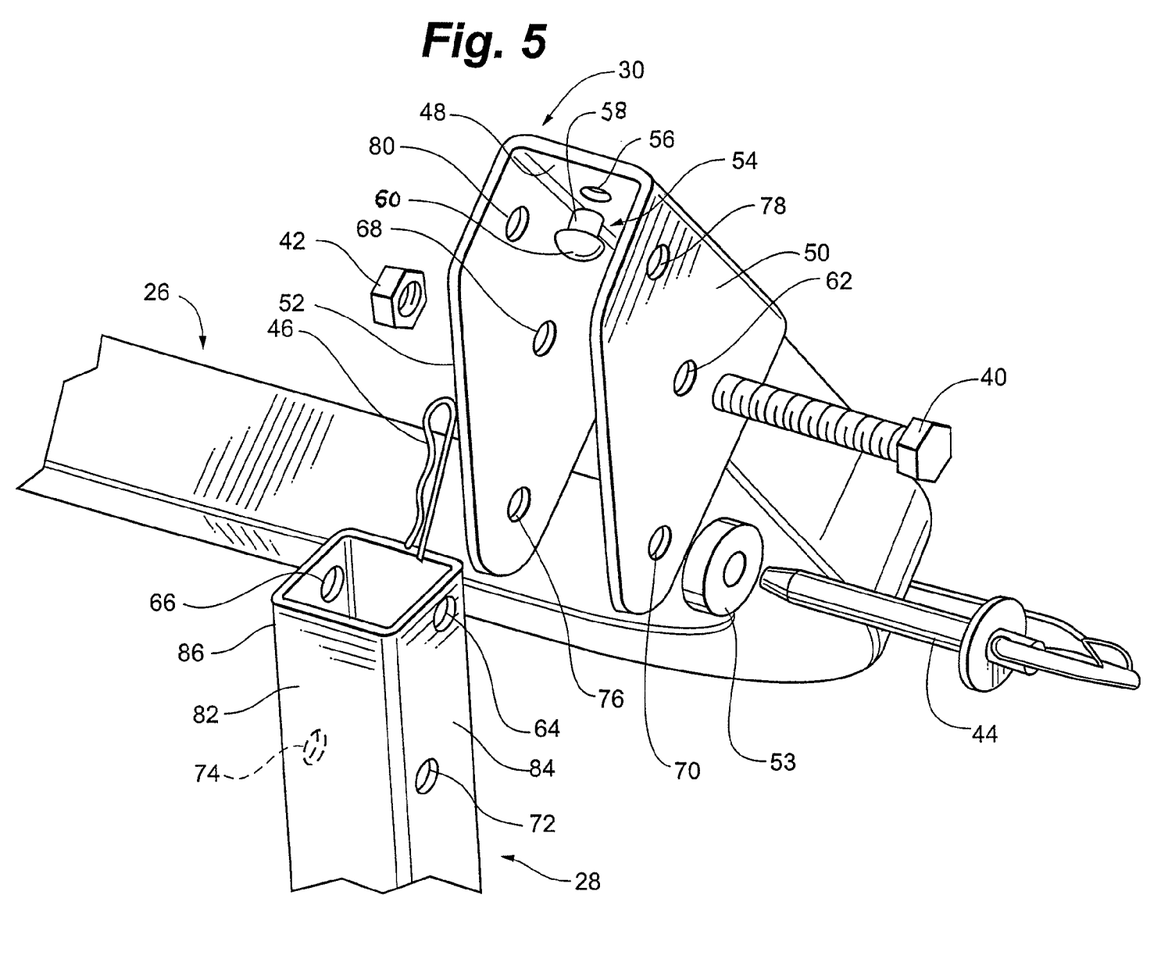
FIG. 5 is an exploded view of the connection area of FIG. 4.

FIG. 5 shows an exploded view of FIG. 4. As illustrated, the first fastener 40 extends through aperture 62 defined in the bracket wall 50, corresponding holes 64 and 66 defined in the lower portion end segment 38, and aperture 68 defined in the bracket wall 52 to secure the lower portion 28 to the bracket 30. As mentioned, the first fastener 40 is secured via the securing member 42. The positioning of the through-bolt 44 depends on the set position of the upper portion 26. If the upper portion 26 is to be set in the lowered position with respect to the lower portion 28 as shown in FIGS. 2 through 5, 9, and 10, the second fastener is extended through aperture 70 defined in the bracket wall 50, corresponding holes 72 and 74 defined in the lower portion end segment 38, and aperture 76 defined in the bracket wall 52. Conversely, if the upper portion 26 is to be set in the raised position with respect to the lower portion 28 (e.g., as shown in FIGS. 1 and 6 through 8, the upper portion is raised from the position (e.g., as shown in FIGS. 2 through 4) so that apertures 78 and 80 (respectively defined in the bracket walls 50 and 52) align respectively with the holes 72 and 74. Subsequently, the second fastener is extended through aperture 78, corresponding holes 72 and 74, and aperture 80 to lock the upper portion in the raised position. Once the second fastener 44 is inserted in one of the two positions as described above, the second fastener 44 is secured via the retaining member 46, enabling quick change out of the second fastener 44 when changing positions of the upper portion 26.

Also included in FIG. 5 is the dampening member 54. As described above, in certain embodiments, the dampening member 54 includes the first portion 58 that is extended through the bore 56 and includes the second portion 60 that is larger in size than the bore 56. As such, when the first portion 58 is inserted in the bore 56, the size of the second portion 60 prevents further extension of the dampening member 54 into the bore 56. The dampening member 54 is shown to be screw shaped; however, the invention should not be limited as such.

So long as the dampening member 54 protrudes from the bracket middle wall 48, the dampening member 54 can be any of a variety of different shapes and still be within the spirit of the invention.

As described above, the upper portion 26 can be locked in either of a raised or lowered position with the proper placement of the second fastener 44 in the corresponding bracket apertures 78 and 80 or 70 and 76. It should be appreciated that upon placing the upper portion 26 in the raised position (e.g., shown in FIG. 1), each of the lower portion end segments 38 are generally received within the bracket channels 34. As such, with reference to FIG. 5, the bracket walls 48, 50, and 52 are brought in contact or close proximity with the outer walls of the lower portion end segment 38. When the upper portion 26 is placed in the raised position, during normal operation of the vehicle 10, contact often occurs between the walls 48, 50, and 52 and the outer walls of the lower portion end segment 38. This contact can occur due to the normal vibration created from operation of the vehicle 10; however this contact is generally most severe when the vehicle 10 is driven over rough or uneven terrain as described above. As further described, this contact generally occurs in large part due to the general shifting of the upper portion 26 during such vehicle operation over rough terrain.

As is generally known, when riding over rough terrain, the vehicle center of gravity can be repeatedly shifted. This shifting, in turn, generally causes the upper portion 26 to shift back and forth, and as a result, causes the upper portion end segment 36 and the bracket 30 operatively coupled thereto to shift back and forth. Consequently, the bracket walls 48, 50, and 52 can repeatedly contact one or more of the outer walls of the lower portion end segment 38. This contact between the walls can cause a rattling, and can often lead to additional stress being placed on one or more of the fastener assemblies (e.g., the first fastener 40 and the securing member 42 and/or the second fastener 44 and the retaining member 46) holding the bracket 30 to the lower portions 28. In some cases, over time, this stress has even led to the breakdown and failure of such fastener assemblies.

With further reference to FIG. 5, in providing the dampening member 54 on the bracket middle wall 48, the general shifting of the upper portion end segment 36 and the bracket 30 operatively coupled thereto is generally limited. In turn, contact occurring between the bracket walls 48, 50, and 52 and the outer walls of the lower portion end segment 38 is also generally limited. As can be appreciated from FIGS. 7 and 8, when the upper portion 26 is set in the raised position, at least a portion of the dampening member 54 (e.g., the second portion 60 thereof) is located between the bracket middle wall 48 and a wall 82 (shown in FIG. 5) of the lower portion end segment 38. As shown in FIG. 5, the bracket middle wall 48 is a planar sheet-like wall of the bracket 30, and the wall 82 of the lower portion end segment 38 is a planar sheet-like wall of the lower portion end segment 38. As such with reference to FIG. 5, the second portion 60 is compressed by the walls 48 and 82 as the upper portion is set in the raised position. The compression of the second portion 60 of the dampening member 54 between these walls 48 and 82 serves two purposes. First, the second portion 60 prevents direct contact between the walls 48 and 82. Second, as can be appreciated, the compression of the second portion 60 by each of the walls 48 and 82 tends to limit movement of the upper portion end segment 36 and the bracket 30 with respect to the lower portion end segment 38. In turn, contact between the side bracket walls 50, 52 and other corresponding walls 84 and 86 (shown in FIG. 5) of the lower portion end segment 38 is limited. As a result, the vibration normally encountered between the side bracket walls 48, 50, and 52 and the walls 82, 84, and 86 of the lower portion end segment 38 is limited, and in turn, the stress normally experienced by the one or more fastener assemblies holding the bracket 30 to the lower portions 28 due to such vibration is also limited.

While not shown in the Figures, it should be appreciated that embodiments can also exist involving the overhead frame structure 12 in which the lower portion end segment 38 is fixedly coupled to the bracket 30 in generally the same fashion as described herein with respect to the upper portion end segment 36. In such embodiments, the upper portion end segment 36 can, in turn, be rotatably coupled to the bracket 30 in generally the same fashion as described herein with respect to the lower portion end segment 38. It is to be appreciated that in such embodiments, when the upper portion 26 is set in the raised position, the bracket walls 48, 50, and 52 are brought in contact or close proximity with the outer walls of the upper portion end segment 36 (similar to that described above with respect to the bracket walls 48, 50, and 52 and the outer walls of the lower portion end segment 38). As such, during normal operation of the vehicle 10, contact would generally occur between the walls 48, 50, and 52 and the outer walls of the upper portion end segment 36. However, by locating the dampening member 54 on the bracket middle wall 48 as described above, such contact and vibration between these walls can be limited. In these further embodiments though, the dampening member 54 is instead located on an upper end portion of the bracket middle wall 48 so as to be located between the bracket middle wall 48 and a corresponding wall of the upper portion end segment 36. By providing the dampening member 54 as such, it should be appreciated that the description provided herein with respect to when the dampening member 54 is located between the bracket 30 and the lower portion end segment 38 is similarly applicable to when the dampening member 54 is located between the bracket 30 and the upper portion end segment 36.

While it is generally not recommended for the vehicle 10 to be operated for any length of time in such configuration, it should also be appreciated that upon placing the upper portion 26 in the lowered position, the upper portion end segments 36 are generally placed in proximity to corresponding lower portion end segments 38. As can be appreciated with reference to FIG. 9, a wall 88 of each of the upper portion end segments 36 is placed proximate to a wall 90 of the corresponding lower portion end segments 38. When the upper portion 26 is placed in the lowered position, during operation of the vehicle 10, contact can occur between these walls 88 and 90 as well as between the bracket walls 50 and 52 and the corresponding outer walls of the upper portion end segment 84 and 86. This contact can occur due to the normal vibration created from operation of the vehicle 10 (shown in FIG. 1); however, as described above, this contact is generally most severe when the vehicle 10 is driven over rough or uneven terrain as described above. As described above, shifting of the upper portion 26 generally occurs during vehicle operation over rough terrain, generally causing the vehicle center of gravity to be repeatedly shifted. This shifting, in turn, generally causes the upper portion 26 to shift back and forth, and as a result, causes the upper portion end segment 36 and the bracket 30 operatively coupled thereto to shift back and forth. Consequently, the wall of the upper portion end segment 88 and the bracket walls 50 and 52 can repeatedly contact one or more of the outer walls of the lower portion end segment 38. This contact between the walls can cause a rattling, and can often lead to additional stress being placed on one or more of the fastener assemblies (e.g., the first and second fasteners 40, 44 and securing and retaining members 42, 46) holding the bracket 30 to the lower portions 28. In some cases, over time, this stress has even led to the breakdown and failure of such fastener assemblies.

Figure 9:
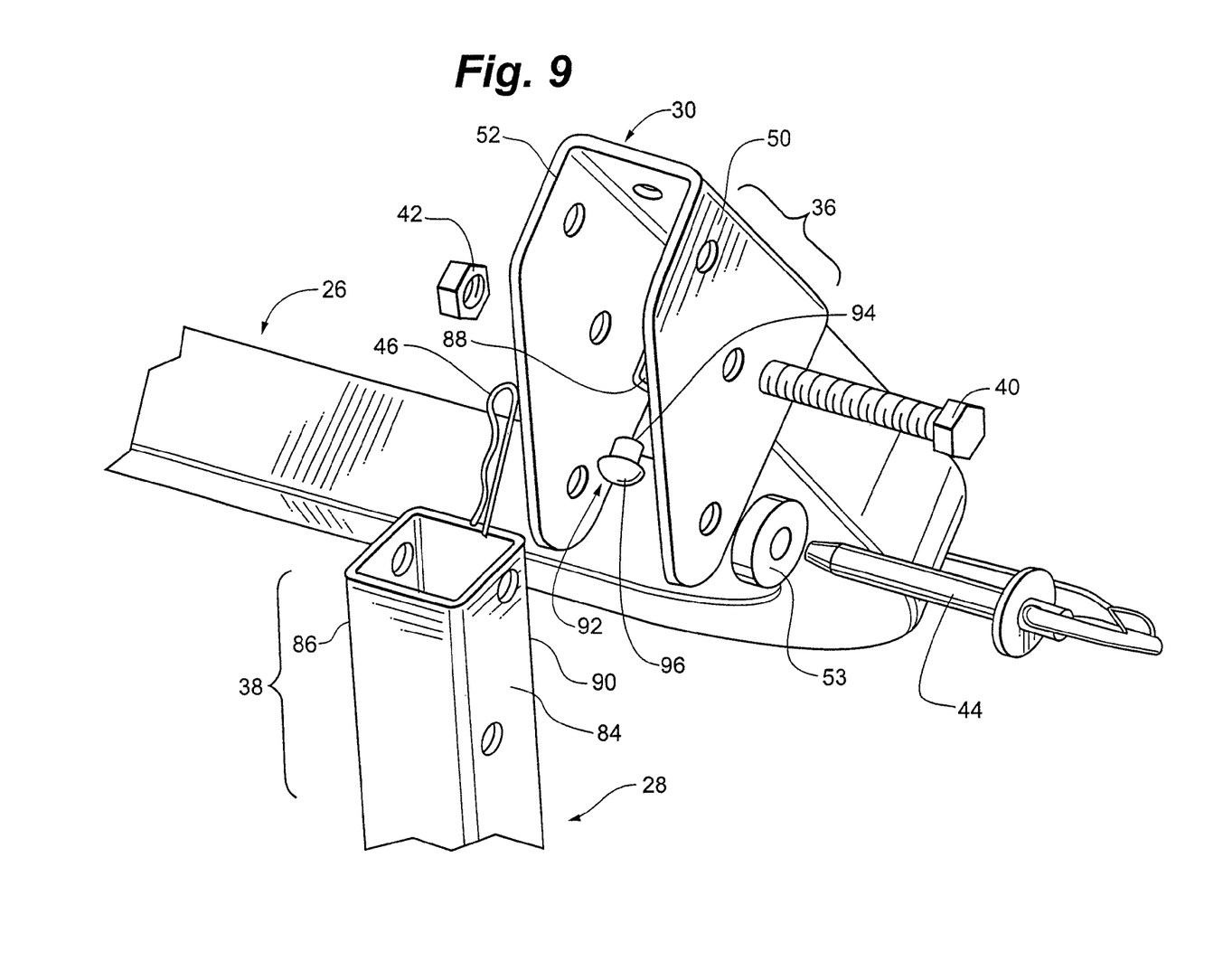
FIG. 9 is a further embodiment of the connection area of FIG. 4.

With further reference to FIG. 9, a dampening component 92 protrudes from one of either the wall 88 of the upper portion end segment 36 or the wall 90 of the lower portion end segment 38. In certain embodiments, the dampening component 92 is operatively coupled to one of either of the walls 88, 90. In certain embodiments, as suggested by FIG. 9, the dampening component 92 partially extends through a bore (not visibly shown) defined in the wall 88 of the upper portion end segment 36. However, the invention should not be so limited. For example, the dampening component 92 can just as well be fixedly coupled to the wall 88 (e.g., via bonding means) or be partially screwed into the wall 88. Further, as described above, the dampening component 90 can alternatively be provided on the wall 90 of the lower portion end segment 38 in such above-described fashions. In certain embodiments, the dampening component 92 is formed of rubber, but should not be limited as such, as the dampening component 92 can be formed of any elastic, yet durable material. The dampening component 92 includes at least one portion provided on the wall 90. In certain embodiments, the dampening component 92 includes a first portion 94 that extends through the bore in the wall 88 and includes a second portion 96 that is larger in size than the bore. As can be appreciated, in using the dampening component 92 in this fashion, the general shifting of the upper portion end segment 36 and the bracket 30 operatively coupled thereto is generally limited. In turn, contact occurring between the outer walls of the lower portion end segment 38 and the segment wall 88 and bracket walls 50, 52 and is generally limited.

As further suggested by FIG. 9, when the upper portion 26 is set in the lowered position, the second portion 96 of the dampening component 92 is located between the wall 88 of the upper portion end segment 36 and the wall 90 of the lower portion end segment 38. As such, the second portion 96 of the dampening component 92 can be compressed by the walls 88 and 90 as the upper portion is set in the lowered position. The compression of the dampening component 92 between these walls 88 and 90 serves two purposes. First, the dampening component 92 prevents direct contact between the walls 88 and 90. Second, as can be appreciated, the compression of the dampening component 92 by each of the walls 88 and 90 tends to limit movement of the upper portion end segment 36 and the bracket 30 with respect to the lower portion end segment 38. In turn, contact between the bracket walls 50 and 52 and other corresponding walls 84 and 86 of the lower portion end segment 38 is limited. As a result, the vibration and contact normally encountered between the walls 88 of the upper portion end segment 36 and bracket walls 50 and 52 and corresponding walls 90, 84, and 86 of the lower portion end segment 38 is limited, and in turn, the stress normally experienced by the one or more fastener assemblies holding the bracket 30 to the lower portions 28 due to such vibration is also limited.

Figure 10:
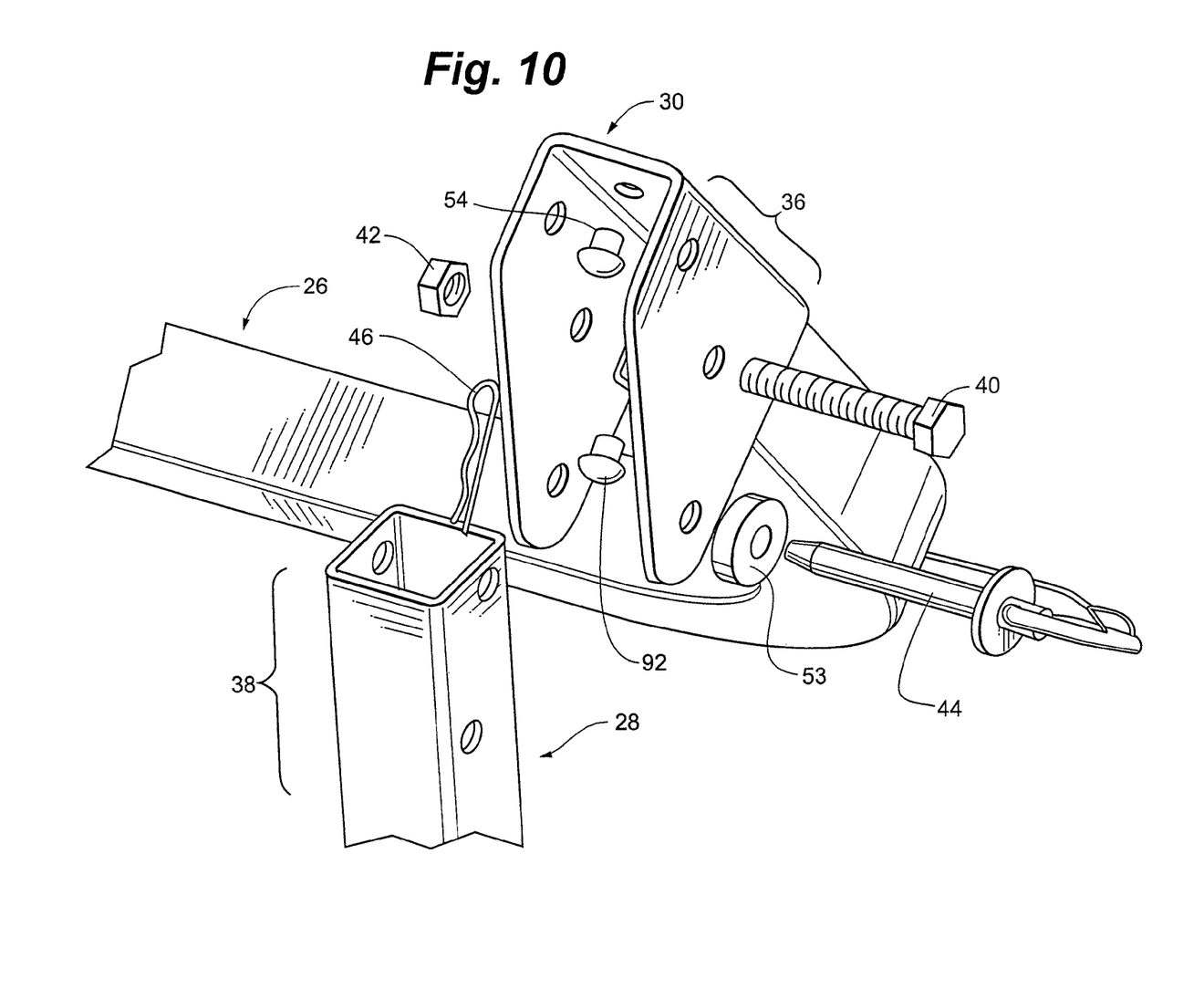
FIG. 10 is a further embodiment of the connection area of FIG. 4.

FIG. 10 illustrates an exploded view of the upper portion 26 in the lowered position in accordance with certain embodiments of the invention in which the dampening member 54 and the dampening component 92 can be used in combination. However, as described above with various aspects of the components, the invention should not be limited to such.

It will be appreciated the embodiments of the present invention can take many forms. The true essence and spirit of these embodiments of the invention are defined in the appended claims, and it is not intended the embodiment of the invention presented herein should limit the scope thereof.

What is claimed is:

1. An overhead frame structure for a vehicle, comprising:
   one or more members forming the overhead frame structure, one of the members having one or more upper portions and one or more lower portions, one upper portion of the one member being operatively coupled yet adjustable with respect to one lower portion of the one member; and
   a first dampening member protruding from a side of the one upper portion, the first dampening member being compressed between the one upper portion and the one lower portion when the one upper portion is in a first position.

2. The overhead frame structure of claim 1, wherein the first dampening member is formed of an elastic and durable material.

3. The overhead frame structure of claim 2, wherein the first dampening member is formed of rubber.

4. The overhead frame structure of claim 1, wherein the one upper portion being in the first position involves the one upper portion extending generally upward.

5. The overhead frame structure of claim 1, further comprising a bracket interconnecting the one upper portion and the one lower portion.

6. The overhead frame structure of claim 5, wherein the bracket forms a channel in which an end segment of the one upper portion and an end segment of the one lower portion are received.

7. The overhead frame structure of claim 5, wherein the bracket is operatively coupled both to an end segment of the one upper portion and an end segment of the one lower portion, and wherein a first of the end segments is fixedly coupled to the bracket and a second of the end segments is rotatably coupled to the bracket.

8. The overhead frame structure of claim 7, wherein the bracket is fixedly coupled to the first of the end segments via a weld joint.

9. The overhead frame structure of claim 7, wherein the bracket is rotatably coupled to the second of the end segments via two or more fastener assemblies.

10. The overhead frame structure of claim 9, wherein the two or more fastener assemblies comprise a bolt and nut and a through-bolt and linchpin.

11. The overhead frame structure of claim 9, wherein the through-bolt comprises an elastic member located between a head of the through-bolt and the bracket, wherein the elastic member is configured to provide a snug securement of the through-bolt by compressible when impacted by direct force and expandable otherwise.

12. The overhead frame structure of claim 7, wherein the second of the end segments defines a pair of apertures which align with a first pair of holes defined in the bracket when the one upper portion is in the first position and which align with a second pair of holes defined in the bracket when the one upper portion is in a second position.

13. The overhead frame structure of claim 12, wherein the one upper portion being in the second position involves the one upper portion extending generally downward.

14. The overhead frame structure of claim 12, further comprising a through-bolt which extends through the pair of apertures and the first pair of holes when the one upper portion is in the first position and which extends through the pair of apertures and the second pair of holes when the one upper portion is in the second position.

15. A method of limiting vibration of an overhead frame structure for a vehicle, comprising:

providing one or more members for forming the overhead frame structure, one of the members having one or more upper portions and one or more lower portions;

interconnecting one upper portion and one lower portion of the one member with the one upper portion being made adjustable with respect to the one lower portion; and locating a first dampening member on the one upper portion, with the first dampening member being compressed between the one upper portion and the one lower portion when the one upper portion is in a first position.

16. The method of claim 15, further comprising the step of operatively coupling the one or more members on a vehicle.

17. An overhead frame structure for a vehicle, comprising:

one or more members forming the overhead frame structure, one of the members having one or more upper portions and one or more lower portions, one upper portion of the one member being adjustable with respect to one lower portion of the one member;

a bracket interconnecting the one upper portion and the one lower portion; and a first dampening member and a second dampening member each coupled to either the bracket or the one upper portion, the first and second dampening members adapted to be conversely compressed depending on whether the one upper portion is in a first position or in a second position, the first dampening member and the second dampening member each adapted to be conversely compressed either between the one upper portion and the bracket or between the one upper portion and the one lower portion.

18. The overhead frame structure of claim 17, wherein the one upper portion being in the first position involves the one upper portion extending generally downward.

19. The overhead frame structure of claim 17, wherein the one upper portion being in the second position involves the one upper portion extending generally upward.

* * * * *